United States Patent [19]
Chin

[11] 4,247,887
[45] Jan. 27, 1981

[54] AC—AC CONVERTER DEVICE

[76] Inventor: Tunghai Chin, No. 90-9, Yamate-cho, Naka-ku, Yokohama City, Kanagawa-Prefecture, Japan

[21] Appl. No.: 929,291

[22] Filed: Jul. 28, 1978

[30] Foreign Application Priority Data

Jul. 28, 1977 [JP] Japan ................................. 52-89764

[51] Int. Cl.³ ............................................ H02M 5/458
[52] U.S. Cl. ....................................................... 363/37
[58] Field of Search ............................... 363/34, 35, 37

[56] References Cited

U.S. PATENT DOCUMENTS

| | | | |
|---|---|---|---|
| 3,341,737 | 9/1967 | Rosa ................................... | 363/37 X |
| 3,403,318 | 9/1968 | Krauthamer et al. .................. | 363/37 |
| 3,942,090 | 3/1976 | Matthes et al. ........................ | 363/37 |
| 3,986,100 | 10/1976 | Beierholm et al. .................. | 363/37 X |
| 4,019,116 | 4/1977 | Klautschek .......................... | 363/37 X |
| 4,025,862 | 5/1977 | Gautheron ............................. | 363/37 |
| 4,066,954 | 1/1978 | Vukasovic et al. ..................... | 363/37 |
| 4,086,622 | 4/1978 | Vukasovic ............................. | 363/37 |

*Primary Examiner*—William M. Shoop
*Attorney, Agent, or Firm*—Wenderoth, Lind & Ponack

[57] ABSTRACT

The present invention is an AC—AC converter device comprising a converter circuit capable of producing an instantaneously varying output voltage, and a coupled reactor commutating inverter circuit cascade-connected thereto, the inverter circuit having a plurality of thyristors which are rendered conductive in a predetermined sequence, in which the output voltage of the converter circuit is rendered positive, negative or zero as necessary to effect commutation and current control in the inverter circuit.

7 Claims, 6 Drawing Figures

FIG_1
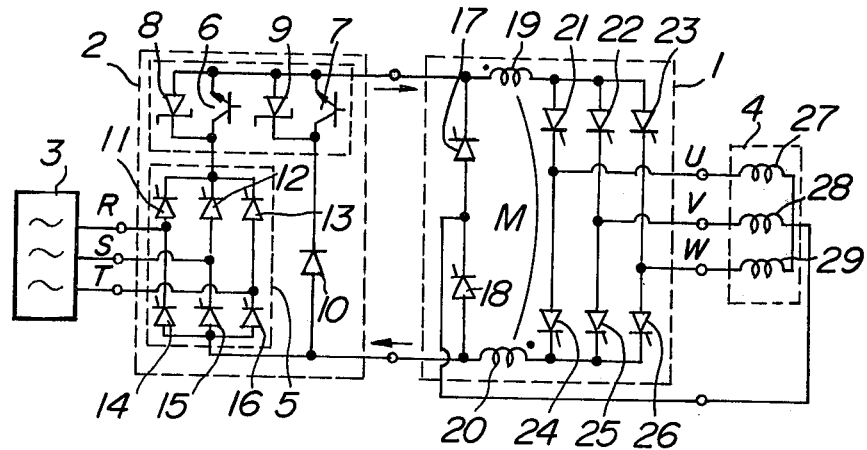
FIG_2
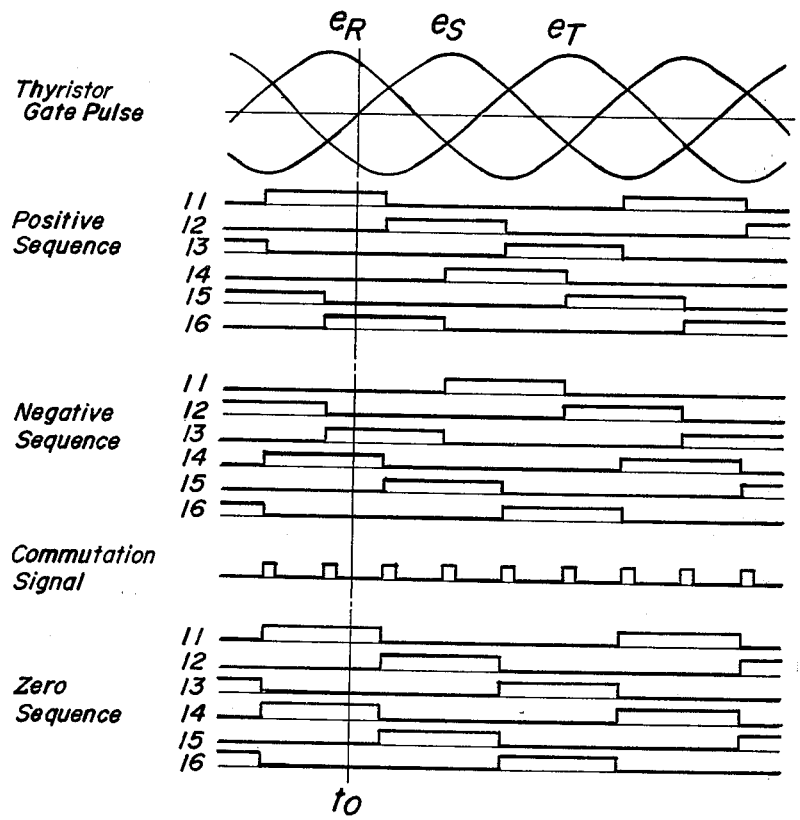

Current Value
Instruction Signal

AC—AC CONVERTER DEVICE

BACKGROUND OF THE INVENTION

1. Field of the Invention

The present invention relates to an AC—AC converter device for generating a polyphase alternating current output having a selectable frequency and a selectable current value using an input power source having a polyphase alternating current.

2. Description of the Prior Art

Conventional AC—AC converter circuits include a cycloconverter system and a system for converting an alternating current input to a direct current output and converting this direct current to an alternating current output. The former system is disadvantageous due to limitations in use, complicated controls and the like, while the latter system has a complicated circuit and may be incapable of providing the needed characteristics.

SUMMARY OF THE INVENTION

It is an object of this invention to provide an AC—AC converter device having excellent input-output characteristics using a coupled reactor commutating inverter circuit having a simple circuit construction and an excellent output characteristic.

The AC—AC converter device according to the present invention comprises a converter circuit capable of providing an instantaneously varying output voltage, and a coupled reactor commutating inverter circuit cascade-connected thereto. The inverter circuit has a plurality of thyristors rendered conducting and controlled in a predetermined sequence. The output voltage of the converter circuit is rendered positive, negative or zero, if necessary, to effect commutation and current control. The converter circuit comprises a polyphase thyristor bridge rectifier circuit connected to an AC source of polyphase alternating current, a chopper unit connected to the DC output side of the rectifier circuit and having two chopper elements, and a current blocking diode connected across the rectifier circuit. The coupled reactor commutating inverter circuit connected to the output of the converter comprises a pair of magnetically coupled reactors each having one terminal connected to a corresponding terminal of the input of the inverter circuit, a plurality of separation thyristors connected in a unit between the other terminals of the coupled reactors, each series connection point of the separation thyristor unit being connected to star-connected armature coils of an AC motor as a load, circulation thyristors connected in series between the terminals of the input of the inverter, and means to connect the series connection point of the circulation thyristors to the neutral point of the star-connected armature coils of the motor whereby the separation thyristors and the circulation thyristors of the inverter circuit are rendered conductive and controlled in accordance with a predetermined sequence, the thyristor unit of the bridge rectifier circuit and the chopper elements are controlled to be rendered conductive or non-conductive, if necessary, and the output voltage of the converter circuit is converted and controlled to be rendered positive, negative or zero to effect commutation and current control.

BRIEF DESCRIPTION OF THE DRAWING

In the accompanying drawings:

FIG. 1 is a principle explanatory view showing an embodiment of the invention with the use of a chopper element having self-commutating action;

FIG. 2 is a diagram showing the sequence of the thyristor gate pulses of a thyristor bridge rectifier circuit used in the device according to the invention;

DESCRIPTION OF THE PREFERRED EMBODIMENTS

Figure 3:
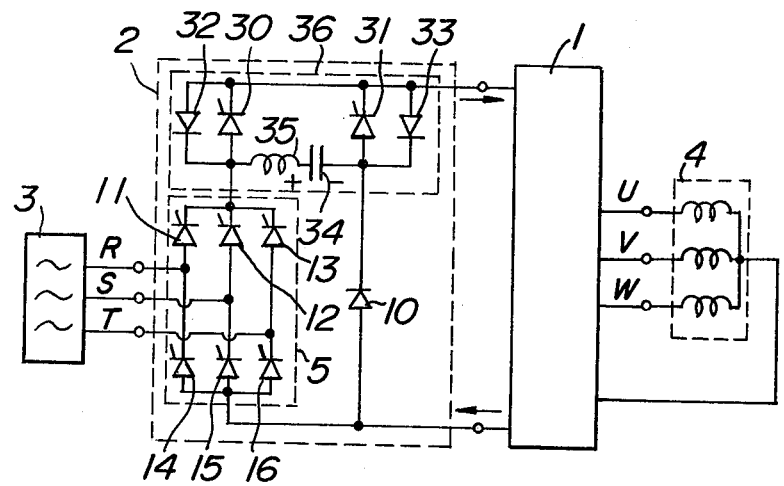
FIG. 3 is a connection diagram showing a second embodiment which uses a thyristor chopper.

Referring now to FIG. 1, a first embodiment of an AC—AC converter device according to the present invention will be described. In FIG. 1, the circuit portion 1 encircled by a dotted line is an output inverter circuit composed of an output circuit of the so-called coupled reactor commutating inverter type. The inverter circuit 1 requires an electric power source for instantaneously converting the output voltage into a positive, negative or zero value. The circuit portion 2 encircled by a dotted line is a converter circuit for instantaneously varying the output voltage for the above purpose. The converter circuit 2 comprises power transistors 6 and 7 as a chopper, Zener diodes 8 and 9 for protecting these transistors, and a polyphase bridge rectifier circuit 5 consisting of a current blocking diode 10 and thyristors 11 to 16. The bridge rectifier circuit 5 is controlled by either a positive voltage pulse sequence or a negative voltage pulse sequence shown in FIG. 2. For example, when the converter 2 is instructed to make the output voltage positive, the positive voltage pulse sequence is applied to the thyristors 11–16 and at the same time, the series connected transistor 6 is switched on and the parallel connected transistor 7 is switched off. The positive voltage pulse sequence is a pulse sequence for causing the bridge rectifier circuit 5 to generate the positive voltage, so that the positive voltage is applied to the inverter 1 through the transistor 6.

If the converter 2 is ordered to convert the output to zero, the transistor 7 is immediately switched on and the transistor 6 is switched off. Then, DC current flows back into the inverter circuit 1 from the converter 2 through the diode 10 and the transistor 7. The output voltage of the converter circuit 2 becomes the sum of the forward direction voltage drops of the diode 10 and the transistor 7, which is almost a zero output voltage. In this state, it is not necessary to apply any gate pulses to the thyristors 11 to 16.

If the converter 2 is ordered to make the output voltage negative, while a negative voltage pulse sequence is applied to the thyristors 11 to 16, the transistor 6 is switched on and the transistor 7 is switched off. The negative voltage pulse sequence is a pulse sequence for causing the bridge rectifier circuit 5 to generate a negative voltage, so that a negative voltage is applied to the inverter circuit 1 through the transistor 6. In addition, when the DC current of the output becomes zero, the thyristor having the gate pulse applied thereto has a reverse voltage applied from the AC power supply source 3, so that the thyristor is turned off and no current flows in the reverse direction. When operating the bridge rectifier circuit 5, with the negative voltage pulse sequence, even if the gate pulse is shifted from one phase to the other phase, it has no ability for self-commutating the current. Therefore, a commutation signal shown in FIG. 2 is generated in accordance with the timing of commutation and the transistor 6 is switched off and the transistor 7 is switched on for a period for maintaining this signal. In other words, during the commutation signal period, the output voltage is made zero and the device waits for restoration of the current blocking ability of the thyristor having a current flowing therethrough. Accordingly, it is necessary to make the duration of the commutation signal longer than the turn-off time of the thyristors 11 to 16. If the inverter circuit 1 as a load plays an important role in the timing of commutation, such as negative voltage commutation, which will be explained later on, it is necessary to provide a control circuit for automatically delaying the commutation signal until this action is completed.

In the case of converting the output voltage of the converter circuit 2 from positive to negative, the instruction for a zero output is first made, the current blocking ability of the thyristors 11 to 16 is restored by waiting a predetermined time during the commutation signal, and the instruction for a negative output is generated. This preliminary time is not required when the output voltage is converted from negative to positive or negative to zero. Thus, the converter circuit 2 can instantaneously vary the output voltage to positive, negative or zero with a time lag of approximately the turn-off time of the thyristor. Further, an element having a self-commutating ability such as a gate turn-off thyristor may be used instead of the transistors 6 and 7.

The action of the coupled reactor commutating inverter circuit 1 inclusive of the converter circuit 2 will be explained hereinafter. The inverter circuit 1 comprises separation thyristors 21 to 26 magnetically coupled reactors 19 and 20, and current circulation thyristors 17 and 18. A polyphase AC motor 4 serving as the output load is a three phase motor having a U-phase armature coil 27, a V-phase armature coil 28 and a W-phase armature coil 29. The inverter circuit 1 utilizes the commutation action of the coupling reactor and is a current type inverter for generating a current waveform having almost 120 degrees of conductive phase angle. At first, the current passes through the coils of the U-phase armature coil 27 and the W-phase armature coil 29 and flows through a closed circuit consisting of the separation thyristor 26, the reactor 20, the converter circuit 2, the reactor 19 and the separation thyristor 21. The value of this current can be regulated and controlled by switching the output voltage of the converter circuit 2 to positive, negative or zero. The action of commutating the current from the U-phase armature coil 27 to the V-phase armature coil 28, with the current of the W-phase armature coil 29 left as it is, is explained. The output voltage of the converter circuit 2 is first made negative and the thyristor 18 is simultaneously turned on. As a result, two closed circuits are constructed. That is, there are two closed circuits formed; the first consisting of elements 29, 26, 20, 18 and 29 and the second consisting of elements 27, 18, 2, 19, 21 and 27. The current of the second closed circuit tends to be reduced due to the negative voltage of the converter circuit 2 and causes a so-called negative voltage commutation action by the action of the magnetically coupled reactors 19 and 20. Meanwhile the current of the second closed circuit is commuted by the first closed circuit to become zero, and the current of the first closed circuit almost doubles. In this state, restoration of the blocking ability of the thyristor 21 is awaited for a certain predetermined time. Thereafter, the output voltage of the converter circuit 2 is made positive, and the separation thyristor 22 is simultaneously turned on. In this manner, besides first closed circuit consisting of elements 29, 26, 20, 18 and 29, there is newly constructed a third closed circuit consisting of elements 28, 18, 2, 19, 22 and 28. A current due to the positive output voltage of the converter circuit 2 flows into this newly formed third closed circuit. The so-called positive voltage commutation action is caused by the action of the magnetically coupled reactors 19 and 20, the current of the first closed circuit is rapidly reduced and the current of the third closed circuit is rapidly increased. At the instant when the currents of both the first and third closed circuits become equal to each other, the current circulation thyristor 18 is turned off and the current passes through the V-phase armature coil 28 and the W-phase armature coil 29 and forms a closed circuit together with elements 26, 20, 2, 19 and 22. Thus, the commutation action from the U-phase armature coil 27 to the V-phase armature coil 28 is completed. When the current successively flows through three phases in this manner, an AC output current of three symmetrical phases can be obtained and the motor 4 driven.

As explained above, when the converter circuit 2 is combined with the coupled reactor commutation inverter circuit 1, there is constructed an AC—AC converter circuit for generating a polyphase AC current having a selectable frequency and a selectable current output value. The input current to this converter circuit constantly flows in a state of maximum power factor as understood from the time relation of the pulse sequence to the three phase power source voltage shown in FIG. 2. Further, since the output has a current type inverter output characteristic for freely controlling the current value, it is preferable for driving an AC motor.

The embodiment shown in FIG. 1 uses transistors as the chopper element, but since the transistors 6 and 7 are always alternately on or off, one thyristor chopper element can be substituted therefor. FIG. 3 shows an embodiment which uses a thyristor chopper. The chopper 36 comprises a first thyristor 30, a second thyristor 31, anti-parallel diodes 32 and 33, a commutation capacitor 34 and a commutation reactor 35. Instead of a thyristor and an anti-parallel diode, a reverse conductive thyristor may be used. The operational principle thereof is entirely same as in the case of the embodiment shown in FIG. 1. For instance, the thyristor 31 is firstly placed in the ON-state and the commutation capacitor 34 is charged in the polarity shown in FIG. 3. Thus the output voltage corresponds to the state of zero. When the instruction for producing a positive output voltage is given to the converter 2, the thyristor 30 is turned on and at the same time the positive sequence pulse is applied to the thyristors 11 to 16 of the bridge rectifier circuit 5. By turning on the thyristor 30, the thyristor 31 is turned off by the discharge current of the commutation capacitor 34 which passes through the closed circuit consisting of elements 34, 35, 30 and 33. The positive output voltage of the bridge rectifier circuit 5 is applied to the thyristor 30. In order to make the output voltage of the converter circuit 2 negative, as in the case of the embodiment of FIG. 1, it is necessary to first make the output voltage zero. For this purpose, the thyristor 31 is turned on and the thyristor 30 is turned off by the discharge of the commutation capacitor 34. When the output voltage becomes zero, the current blocking ability of the thyristors 11 to 16 is restored after a short delay, the thyristor 30 is again turned on, while the thyristor 31 is turned off by the commutation action described above, and the negative sequence pulse is applied to the thyristors 11 to 16 of the bridge rectifier circuit 5. As a result, a negative output voltage can be obtained. The other actions and commutation signals correspond to the embodiment of FIG. 1.

Figure 4:
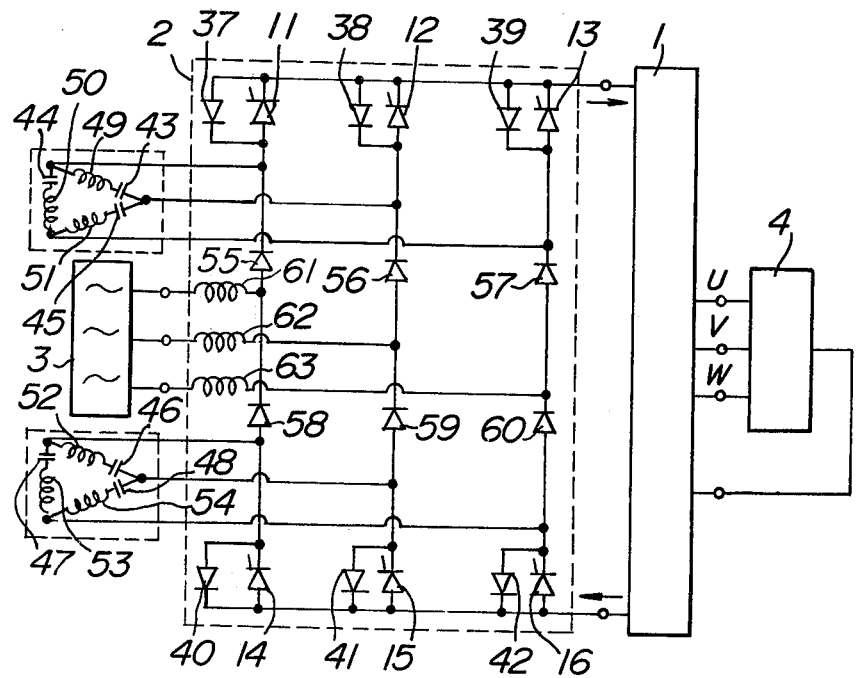
FIG. 4 is a connection diagram showing a third embodiment with special commutation circuits added to each thyristor of the thyristor bridge rectifier circuits.

FIG. 4 shows an embodiment for high speed action enlarging the circuit according to the invention. In the converter circuit 2 shown in FIG. 4, each of the main thyristors 11 to 16 of the bridge rectifier circuit is provided with respective anti-parallel diodes 37 to 42, commutation capacitors 43 to 48, commutation reactors 49 to 54 and series connected diodes 55 to 60 for blocking discharge of the commutation capacitors as illustrated, and thus each thyristor forms a chopper. Each main thyristor and anti-parallel diode combination can be replaced by a reverse conductive thyristor. The compensating reactors 61 to 63 inserted between the three phase AC source 3 are for compensating for energy lost by the commutation capacitors during commutation. The two commutation systems of the embodiments shown in FIGS. 1 and 3 requires either a predetermined commutation time or a commutation signal shown in FIG. 2, which is not required in the embodiment of FIG. 4. The action of the converter circuit 2 is as follows. The time is assumed to be $t_o$ as shown in FIG. 2. The converter 2 generates a positive voltage output at this time. Accordingly, the main thyristors 11 and 16 are placed in the ON state by the positive voltage pulse sequence. If an order to make the output voltage zero is given at this point, the gate pulse sequence is merely converted from the positive voltage pulse sequence to the zero sequence shown in FIG. 2. For the zero sequence, the gate pulse sequence for the thyristor 11 is unchanged from that of the positive sequence, but the thyristor 14 is turned on by a new gate pulse sequence. If the polarities of the commutation capacitors 46 to 48 are as illustrated, the charges of the commutation capacitors 46 to 48 are discharged through respective commutation reactors 52 to 54, the anti-parallel diode 42 and the thyristor 14 when the thyristor 14 is on, thus the thyristor 16 is turned off. The DC output current flows from the first output terminal through the thyristor 14, the diodes 58 and 55 and the thyristor 11 to the second output terminal of the converter circuit 2. Accordingly, the output voltage becomes the forward voltage drop of these four elements or almost zero. If an order to produce a negative output voltage is given at the time $t_o$, it is preferable to convert the gate pulse sequence of the thyristors 11 to 16 from the positive voltage pulse sequence to the negative voltage pulse sequence. Then, the thyristors 13 and 14 are turned on. By turning the thyristor 14 on, the thyristor 16 is turned off by a commutation action. By turning the thyristor 13 on, the thyristor 11 is turned off in the same manner. The commutation actions simultaneously carried out by the two thyristors do not interfere with each other due to the presence of the series connected diode. The commutation action reverses the polarities of the commutation capacitors 43 to 48. When the and charging of the commutation capacitors 43 to 48 in the reverse polarity is completed, the negative output voltage appears on the output terminal. The converter circuit 2 can freely and instantaneously convert its output voltage by changing the gate pulse sequence of the thyristors. In addition, besides commutation by output order, there is similarly carried out commutation based on the change of the input power source voltage every 60° of phase angle. In either the commutation by order or the commutation by the change of the power source voltage, it is necessary to provide a control circuit to prevent continuous occurrence longer than the time necessary for two commutations.

Figure 5:
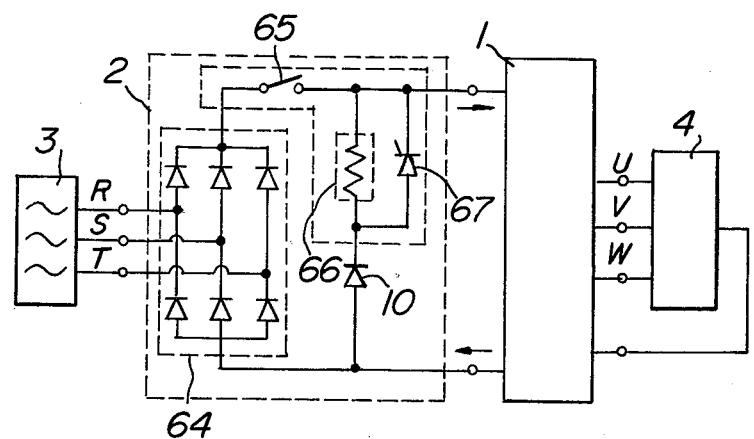
FIG. 5 is a connection diagram showing a fourth embodiment for the case not requiring any power regeneration.

When power regeneration of the AC supply source is not required, the circuit according to the invention can be simplified, an example of which is shown in FIG. 5. FIG. 5 shows a converter circuit 2 consisting of the rectifier diode bridge 64, the chopper 65, the non-linear resistance 66, the parallel bypass thyristor 67 and the current blocking diode 10. A transistor, a gate turn off thyristor or a thyristor chopper may be used as shopper 65. When the chooper is switched on, a positive voltage is output. When the chopper is switched off, the output current flows from the lower output terminal to the upper output terminal through the diode 10 and the non-linear resistance 66. The voltage of the non-linear resistance 66 appears at the output terminals as a negative output voltage. The output voltage is made zero by turning the bypass thyristor 67 on, therefore current flows through the diode 10 and the bypass thyristor 67 and the output voltage becomes the forward voltage drop of these elements. Further, in order to change the output voltage from the zero state to the negative state, the chopper 65 is first switched on to generate a positive output voltage, the current blocking ability of the bypass thyristor 67 is restored after a delay, and the chopper 65 is switched off to obtain the negative output voltage.

Figure 6:
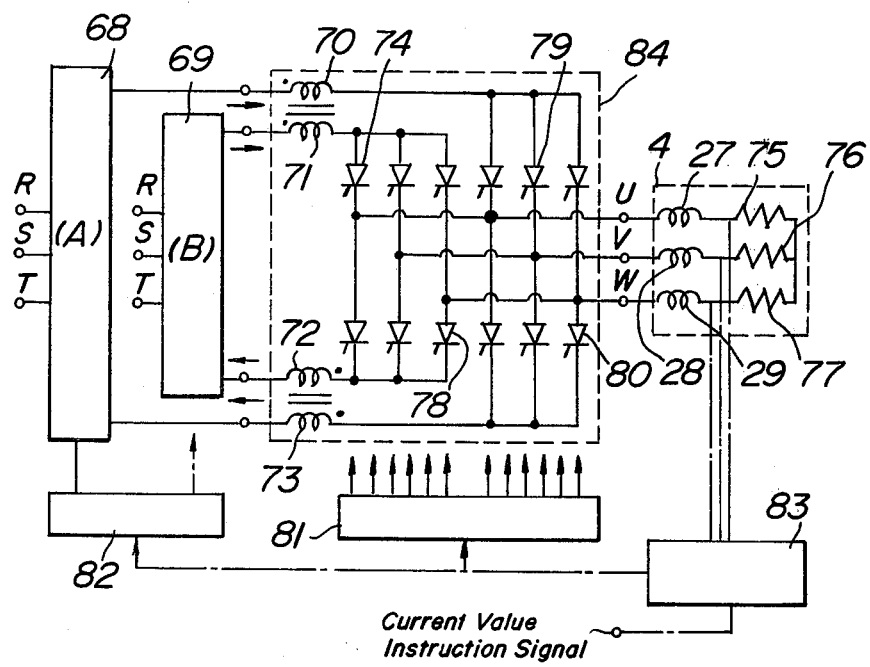
FIG. 6 is a connection diagram showing a fifth embodiment which generates an output current wave-form having a conductive angle of more than 120°.

The above described embodiment is of an AC—AC converter circuit constructed by combining the output voltage instantaneous variable converter circuit 2 with the coupled reactor commutation inverter circuit 1. Its output current is a symmetrical polyphase alternating current having an selectable waveform of up to almost 120° of conductive phase angle. The following embodiment relates to an AC—AC converter circuit in which the output current can be any selected waveform of more than 120° of conductive phase angle. FIG. 6 shows its construction. FIG. 6 illustrates an AC—AC converter circuit made by combining two output voltage instantaneous variable converter circuits A(68) and B(69) and two coupled reactor commutation inverters forming inverter 84. Its operation is as follows. Supposing that a current flows into the motor 4 under a certain acting state, the terminal voltages of current detecting resistances 75 to 77 are applied to a current control circuit 83 as a load current signal. The load current signal is compared with a current value instruction signal, the deviation and polarity of the load current value from the instruction value are examined, a control signal is transmitted from the current control circuit 83 to the thyristor gate pulse distribution circuit 81 and the converter output voltage instruction circuit 82, and the load current value is controlled to a desired value. For instance, at a certain time, the output current flows from the converter circuit B (69) through the coupling reactor 71, the separation thyristor 74, the U-phase armature coil 27, the current detecting resistances 75 and 77, the W-phase armature coil 29, the separation thyristor 78 and the coupling reactor 72. If the current value instruction signal increases the V-phase current and decreases the U-phase current, the separation thyristors 79 and 80 are immediately turned on, the output voltage of the converter circuit A(68) is set at positive and the output voltage of the converter circuit B(69) is set at zero or negative. In this case, two closed circuits are formed. That is, a closed circuit consisting of circuits elements 69, 71, 74, 27, 75, 77, 29, 78 and 72 is formed and another closed circuit consisting of elements 68, 70, 79, 28, 76, 77, 29, 80 and 73 is formed. The current of these two closed circuits causes a positive voltage commutation action by the action of the magnetically coupled reactors 70, 71, 72 and 73. The former closed circuit current has the positive voltage source inserted thereinto and is increased, while the latter closed circuit current is decreased. The manner of changing the U, V and W phase armature currents can be freely adjusted by combining positive, zero and negative output voltages of the converter circuit A(68) and the converter circuit B(69). For instance, if the induced voltage of the armature is small and the output voltage of the circuit A is positive and the output voltage of the circuit B is zero, the V-phase current is increased, the U-phase current is decreased, the W-phase current is gradually increased. If the voltage of the circuit A is zero and the voltage of the circuit B is negative, the V-phase is increased, the U-phase is decreased and the W-phase is gradually decreased. If the voltage of the circuit A is positive and the voltage of the circuit B is negative, the V-phase is rapidly increased, the U-phase is rapidly decreased and the W-phase is hardly changed. If the voltages of both the circuits A and B are positive, the V, U and W phase are increased. If the voltages of both circuits A and B are negative, the V, U and W phases are decreased. If the voltages of both circuits A and B are zero, the V, U and W phases are hardly changed. In this case, the V-phase current tends to be increased, so that it is not considered to lower the voltage of the circuit A than that of the circuit B. The load current of the AC—AC converter circuit composed of the converter circuits A (68) and B (69) and the coupled reactor commutating inverter circuit 84 can be regulated into a selected value by setting a current value instruction signal and can be made into a waveform close to a three phase sinewave.

As described above, the AC—AC converter circuit according to the invention has the merits of both of the output voltage instantaneous variable converter circuit and a coupled reactor commutation inverter circuit. That is, the input current constantly flows under a state of maximum power factor. The intermediate DC current for coupling the converter to the inverter can be ON-OFF controlled at a high rate, so that the direct current smoothing reactor (this role is played by the coupling reactor) is made smaller as compared with a bridge rectifier circuit phase control system. The input current has a higher harmonic component at high frequencies in the same manner, so that filtration becomes easy. The power can be regenerated with the circuit as it is, the reactive power of the load can easily be treated with the use of the coupling reactor commutation method, even with the output current of 120° conductive phase angle or 180° conductive phase angle, the current waveform is relatively freely controllable. The oscillation torque parasitic to the axial output torque of the load motor can be controlled by the former action. Since the smoothing reactor is small and the current is ON-OFF controlled, the stability of the whole system becomes high and response becomes quick, the current control type AC—AC converter having a high response can easily control the whole system inclusive of the load motor, the upper limit frequency of the load motor can be high regardless of the amplitude of the load in the same manner, and the circuit can be protected from accidental excessive current.

As explained above, the invention can generate a polyphase alternating current having a selectable frequency and a selectable current value with a polyphase alternating current as an electric power source and can drive an AC motor a low power factor within a wide speed range in a state of stable operation and high input power factor.

What is claimed is:

1. An AC—AC converter device comprising:
  a converter circuit for connection to a source of polyphase alternating current capable of instantaneously varying an output voltage to a positive voltage, a negative voltage or zero; and a coupled reactor commutating inverter circuit cascade-connected to said converter circuit, said inverter circuit consisting of only coupled reactors and a plurality of thyristors which and rendered conductive in a predetermined sequence, whereby said output voltage of said converter circuit is rendered positive, negative or zero instantaneously as necessary to effect commutation and current control in said inverter circuit.

2. An AC—AC converter device comprising:
  a pair of converter circuits, each capable of instantaneously varying an output voltage to a positive voltage, a negative voltage or zero; a pair of coupled reactor commutating inverter circuits cascade-connected to a corresponding one of said pair of converter circuits for parallel-connection to an AC motor as a load, each of said inverter circuits including first and second magnetically coupled reactors having first and second terminals, said first terminals connected to respective input terminals of said inverter circuit, said first reactors of each of said inverter circuits magnetically coupled together and said second reactors of each of said inverter circuits magnetically coupled together, said inverter circuits further including a plurality of separation thryistors connected as a unit between said second terminals of said first and second reactors, each series connection point of said separation thyristor units for connection to star-connected armature coils of the AC motor as a load, said separation thyristors rendered conductive and controlled in accordance with a predetermined sequence, whereby said output voltage of each of said pair of converter circuits is rendered positive, negative or zero as necessary to effect commutation and current control in said corresponding inverter circuit.

3. An AC—AC converter device comprising:
  a converter circuit for connection to a source of polyphase alternating current capable of instantaneously varying an output voltage to a positive voltage, a negative voltage or zero, and converter circuit comprising a rectifier circuit having a polyphase thyristor bridge for connection to the source of polyphase alternating current; a chopper unit connected to the DC output side of said rectifier circuit having two chopper elements and a current blocking diode connected across said rectifier circuit; and a coupled reactor commutating inverter circuit cascade-connected to said converter circuit, said inverter circuit comprising a pair of magnetically coupled reactors each having first and second terminals, said first terminals connected to respective terminals of the input of said magnetically coupled reactors; means for connection of each series connection point of said separation thyristor unit to respective star-connected armature coils of an AC motor as a load; circulation thyristors connected in series between the respective input terminals of said inverter circuit; and means to connect the series connection point of the circulation thyristors to the neutral point of the star-connected armature coils of the AC motor; whereby said separation thyristors and said circulation thyristors of said inverter circuit are rendered conductive and controlled in accordance with a predetermined sequence, respectively, and said polyphase thyristor bridge rectifier circuit and said chopper elements are rendered conductive or nonconductive as necessary to render the output voltage of said converter circuit positive, negative or zero to effect commutation and current control.

4. An AC—AC converter device as claimed in claim 3, wherein said chopper unit comprises: a first chopper element including a parallel combination of a first transistor and a first Zener diode connected to the DC output side of said rectifier circuit having a self-commutating action; and a second chopper element including a parallel combination of a second transistor and a second Zener diode connected between said first chopper element and said current blocking diode having a self-commutating action.

5. An AC—AC converter device as claimed in claim 3, wherein said chopper unit comprises: a first chopper element including a first thyristor, having a first diode anti-parallel connected thereto, connected to the DC output side of said rectifier circuit; a second chopper element including a second thyristor, having a second diode anti-parallel connected thereto, connected between said first thyristor and said current blocking diode; and a series combination of a commutating capacitor and a commutating reactor connected between said first and the second chopper elements.

6. An AC—AC converter device as claimed in claim 3, wherein said chopper unit comprises: a first chopper element including an electronic switch connected to the DC output side of said rectifier circuit; and a second chopper element including a parallel combination of a non-linear resistor element and a bypass thyristor connected between said first chopper element and said current blocking diode.

7. An AC—AC converter device comprising:

a converter circuit for connection to a source of polyphase alternating current capable of instantaneously varying an output voltage to a positive voltage, a negative voltage or zero, said converter circuit comprising a plurality of compensating reactors for connection to respective phases of the source of polyphase alternating current; a discharge blocking diode bridge circuit connected to the source of polyphase alternating current through said compensating reactors; first and second commutating circuits each consisting of a series combination of a capacitor and a reactor connected to respective DC outputs of said discharge blocking diode bridge circuits; and first and second rectifier circuits each consisting of a first thyristor and a first diode anti-parallel connected thereto which are connected between the outputs of the converter and said first and the second commutating circuits, respectively; and a coupled reactor commutating inverter circuit cascade-connected to said converter circuit, said inverter circuit having a plurality of thyristors which are rendered conductive in a predetermined sequence, whereby said output voltage of said converter circuit is rendered positive, negative or zero as necessary to effect commutation and current control in said inverter circuit.

* * * * *

UNITED STATES PATENT AND TRADEMARK OFFICE
CERTIFICATE OF CORRECTION

PATENT NO. : 4,247,887
DATED : January 27, 1981
INVENTOR(S) : Tunghai Chin

It is certified that error appears in the above-identified patent and that said Letters Patent are hereby corrected as shown below:

Column 3, line 40, after "26" insert --,--.

Column 4, line 67, after "applied to" insert --the inverter through--.

Column 5, line 67, delete "and".

Column 6, line 21, change "chooper" to --chopper--.

Column 7, line 14, change "former" to --latter--;

line 16, change "latter" to --former--.

Column 8, line 12, after "motor" insert --having--;

line 24, change "and" to --are--;

line 63, change "and" to --said--.

Signed and Sealed this

Tenth Day of November 1981

[SEAL]

Attest:

GERALD J. MOSSINGHOFF

Attesting Officer    Commissioner of Patents and Trademarks